United States Patent
Tsuchino et al.

(10) Patent No.: US 7,649,887 B2
(45) Date of Patent: Jan. 19, 2010

(54) BRIDGING DEVICE AND METHOD AND COMPUTER READABLE MEDIUM FOR CONTROLLING THE SAME

(75) Inventors: Wakana Tsuchino, Tokyo (JP); Seijiro Yoneyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 397 days.

(21) Appl. No.: 11/609,812

(22) Filed: Dec. 12, 2006

(65) Prior Publication Data

US 2007/0133545 A1      Jun. 14, 2007

(30) Foreign Application Priority Data

Dec. 12, 2005   (JP)   ............................ P2005-357974

(51) Int. Cl.
*H04L 12/56* (2006.01)
(52) U.S. Cl. ...................................... 370/392; 370/401
(58) Field of Classification Search ................. 370/254, 370/394
See application file for complete search history.

(56) References Cited

U.S. PATENT DOCUMENTS

2003/0204635 A1 * 10/2003 Ko et al. ..................... 709/250

OTHER PUBLICATIONS

RFC 2461 Neighbor Discovery for IP Version 6 (IPv6) dated May 30, 2006 and 93 Pages.

* cited by examiner

*Primary Examiner*—Robert W Wilson
(74) *Attorney, Agent, or Firm*—Oblon, Spivak, McClelland, Maier & Neustadt, L.L.P.

(57) ABSTRACT

A bridging device, and a method and computer readable medium for controlling the bridging device, wherein the bridging device stores router identifying information and network prefix information contained in a router advertisement (RA) that is regularly sent from a router. When the stored router identifying information and network prefix information become invalid, the bridging device generates an RA packet containing new valid router identifying information and network prefix information, whose lifetime is set infinite, and sends the RA packet to a communication terminal. This arrangement can reduce the frequency of the transmission of the RA packet from the router to the communication terminal, thereby decreasing the RA-packet processing load of the communication terminal.

10 Claims, 9 Drawing Sheets

| Default Router | Router Identifying Information | Lifetime |
|---|---|---|
| * | R1 | T1 |
|  | R2 | T2 |
|  | R3 | T3 |

FIGURE 2

| Network Prefix | Lifetime |
|---|---|
| P1 | t1 |
| P2 | t2 |
| P3 | t3 |
| P4 | t4 |

FIGURE 3

BRIDGING DEVICE AND METHOD AND COMPUTER READABLE MEDIUM FOR CONTROLLING THE SAME

CROSS-REFERENCE TO RELATED APPLICATION

This application is based upon and claims the benefit of priority from the prior Japanese Patent Application No. JP2005-357974, filed Dec. 12, 2005, the entire contents of which are incorporated herein by reference.

BACKGROUND OF THE INVENTION

1. Field of the Invention

The present invention relates to a bridging device and a method and a program product for controlling the bridging device, and in particular, it relates to a bridging device that relays data transmitted from a router to a communication terminal and a method and a program product for controlling the bridging device.

2. Description of the Related Art

Internet Protocol version 6 (IPv6) has come into widespread use in recent years as a protocol for communication between terminals via networks.

In IPv6 communication networks, a router on a network transmits a router advertisement (RA) packet containing identifying information of the router and a network prefix to a communication terminal on the network. The communication terminal that has received the RA packet generates its own global unicast address using the network prefix contained in the received RA packet. The communication terminal communicates with a communication terminal on another network via the router that has sent the RA packet using the generated global unicast address (for example, refer to Narten, T., E. Nordmark, and W. A. Simpson, "Neighbor Discovery for IP version 6 (IPv6), RFC2461, December, 1998").

The RA packet sent from the router includes, in addition to the above-mentioned router identifying information and network prefix, information on the valid period (lifetime) for insuring the validity of the information. The router sends RA packets at regular intervals to update the lifetime. However, the router identifying information and the network prefix contained in the RA packet do not change unless the router is replaced with a new router or the network prefix is changed to a different value. Accordingly, in networks in which the replacement of the router or the change of the network prefix hardly occur, the communication terminal continues receiving RA packets only for updating the lifetime at regular intervals.

It is not desirable that a communication terminal continues receiving RA packets only for updating the lifetime of the router identifying information and the network prefix at regular intervals because it increases the load of packet processing on the communication terminal. Particularly, the increase in load due to the continuous reception of RA packets is undesirable to low-cost communication apparatus with a low processing capability because it results in a decrease in the data processing capacity of the sensor node.

Furthermore, when a plurality of routers is present on the network, the communication terminal must receive RA packets that are regularly sent from the routers. This may cause a significant decrease in the throughput of the communication terminal.

If RA packets are frequently sent from a router to a communication terminal on a network, the transmission efficiency of the network may be decreased.

The IPv6 communication of the related art thus has the problem of increasing the load on a communication terminal because it receives RA packets from a router at regular intervals.

SUMMARY OF THE INVENTION

According to one aspect of the present invention there is provided a bridging device that selectively relays RA packets transmitted from a router to a communication terminal thereby to reduce an RA-packet processing load of the communication terminal.

According to another aspect of the present invention there is provided a method and a computer readable medium for controlling the bridging device.

According to an embodiment of the invention, there is provided a novel bridging device including a storage unit configured to store router identifying information and network prefix information in association with respective lifetimes; a first receiving unit configured to receive a first router advertisement packet containing router identifying information and network prefix information, and the respective lifetimes; an updating unit configured to update the router identifying information, the network prefix information, and the respective lifetimes which are stored in the storage unit by using the router identifying information, the network prefix information, and the respective lifetimes contained in the first router advertisement packet received by the first receiving unit; a determination unit configured to determine whether the router identifying information and the network prefix information stored in the storage unit is valid with respect to the lifetimes stored in the storage unit; a generation unit configured to generate a second router advertisement packet when the determination unit determines that, among the router identifying information stored in the storage unit, identifying information of a router having the highest priority for communication is invalid or when the determination unit determines that any of the network prefix information stored in the storage unit is invalid, the second router advertisement packet containing identifying information of the router having the highest priority of the valid-router identifying information stored in the storage unit and valid-network-prefix information stored in the storage unit, whose lifetimes are set infinite; and a transmission unit configured to transmit the second router advertisement packet to a communication terminal.

According to another aspect of the present invention, there is provided a method for controlling a bridging device having a storage unit configured to store router identifying information and network prefix information in association with respective lifetimes and a determination unit configured to determine whether the router identifying information and the network prefix information stored in the storage unit is valid using the lifetimes stored in the storage unit, the method including receiving a first router advertisement packet containing router identifying information and network prefix information, and the respective lifetimes; updating the router identifying information, the network prefix information, and the respective lifetimes which are stored in the storage means by using the router identifying information, the network prefix information, and the respective lifetimes contained in the received first router advertisement packet; generating a second router advertisement packet when the determination means determines that, of the router identifying information stored in the storage unit, identifying information of a router having the highest priority for communication is invalid or when the determination means determines that any of the network prefix information stored in the storage unit is invalid, the second router advertisement packet containing identifying information of the router having the highest priority of the valid-router identifying information stored in the storage unit and valid-network-prefix information stored in the storage unit, whose lifetimes are set infinite; and transmitting the generated second router advertisement packet to a communication terminal.

According to yet a further aspect of the present invention, there is proved a computer readable medium storing a computer program which when executed by a bridging device results in performance of steps including storing router identifying information and network prefix information in association with the respective lifetimes; receiving a first router advertisement packet containing router identifying information and network prefix information, and the respective lifetimes; updating the router identifying information, the network prefix information, and the respective lifetimes using the router identifying information, the network prefix information, and the lifetime of the information contained in the first router advertisement packet received; determining whether the stored router identifying information and the network prefix information is valid using the stored lifetime; generating a second router advertisement packet when it is determined that, among the stored router identifying information, identifying information of a router having the highest priority for communication is invalid or when it is determined that any of the stored network prefix information is invalid, the second router advertisement packet containing identifying information of a router having the highest priority among the stored valid-router identifying information and stored valid-network-prefix information, whose lifetimes are set infinite; and transmitting the generated second router advertisement packet to a communication terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an illustration of an example of a router-identifying-information database according to an embodiment of the invention;

FIG. 3 is an illustration of an example of a network-prefix database according to an embodiment of the invention;

DETAILED DESCRIPTION OF THE PREFERRED EMBODIMENTS

Figure 1:
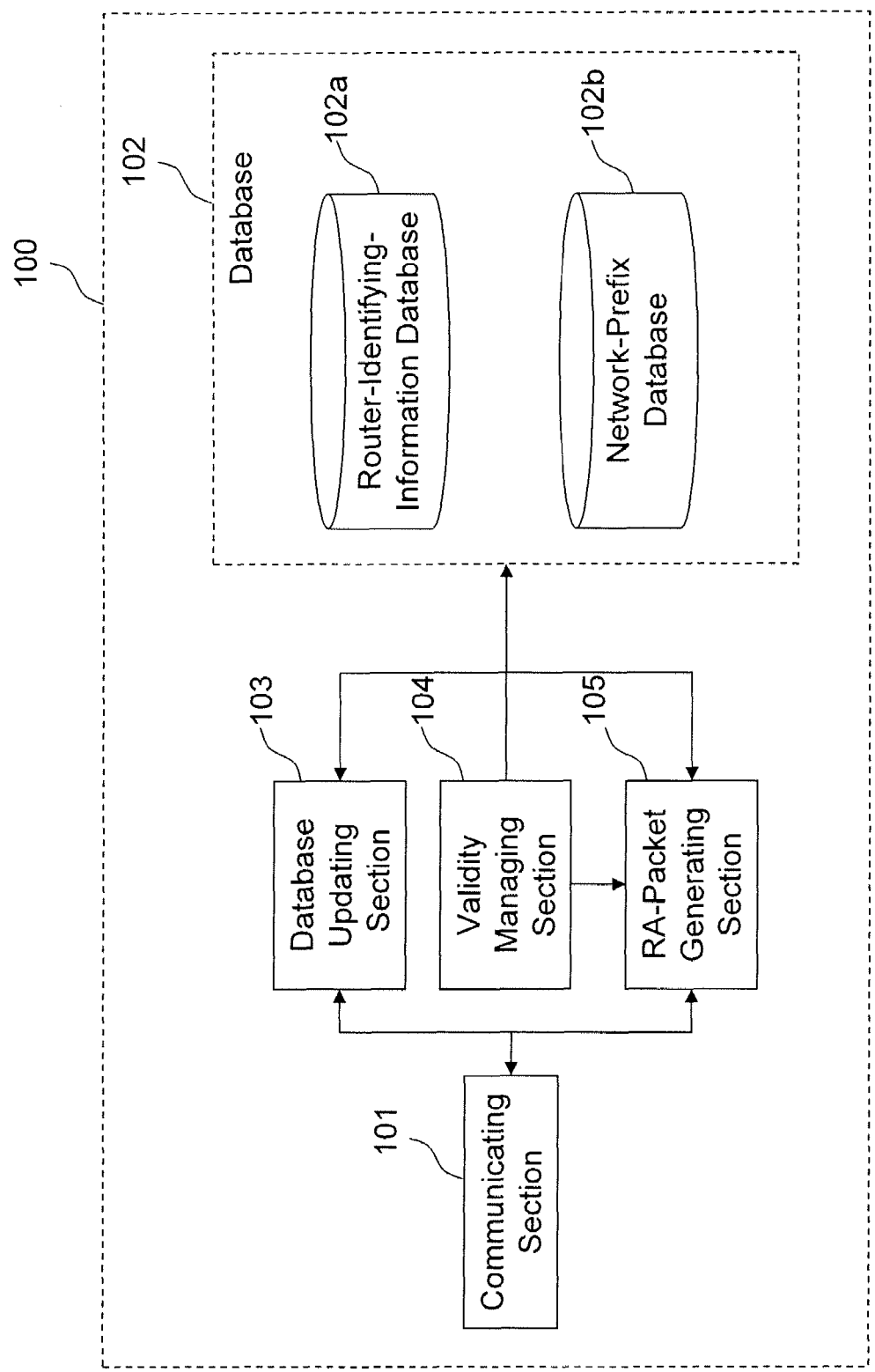
FIG. 1 is a block diagram of a bridging device according to an embodiment of the invention.

Referring now to the drawings, wherein like reference numerals designate identical or corresponding parts throughout the several views, and more particularly to FIG. 1 thereof, FIG. 1 is a block diagram of a bridging device 100 according to an embodiment of the invention.

The bridging device 100 includes a communicating section 101 for sending and receiving data such as a router advertisement (RA) packet or a router solicitation (RS) packet between a router and a communication terminal via a network, a database 102 that stores router identifying information (for example, the IP address of a router, hereinafter, referred to as router identifying information) and a network prefix, a database updating section 103 that updates the database 102 using router identifying information contained in an RA packet received by the communicating section 101, a validity managing section 104 that manages the validity of the router identifying information and the network prefix stored in the database 102, and an RA-packet generating section 105 that generates an RA packet using router identifying information stored in the database 102.

The database 102 includes a router-identifying-information database 102a that stores router identifying information in association with its lifetime and a network-prefix database 102b that stores a network prefix in association with its lifetime.

FIG. 2 shows an example of the router-identifying-information database 102a that stores three pieces of router identifying information in association with their lifetimes. FIG. 3 shows an example of the network-prefix database 102b that stores four network prefixes in association with their lifetimes. In the router-identifying-information database 102a shown in FIG. 2, one of the router identifying information is selected as information that identifies a router having the highest priority for communication (hereinafter, referred to as a default router, R1 in FIG. 2). When the default-router identifying information becomes invalid, new router identifying information is selected from valid router identifying information. The selected router identifying information is set as a default router.

The validity of the router identifying information and the network prefix is managed by the validity managing section 104. The validity managing section 104 manages the validity by determining whether the router identifying information or the network prefix is valid with reference to the lifetime stored in the router-identifying-information database 102a or the network-prefix database 102b.

More specifically, the validity managing section 104 decrements the lifetime of the router identifying information or the network prefix stored in the database 102 using a timer or the like, and when the lifetime reaches zero, it determines that the router identifying information or the network prefix has become invalid.

Alternatively, when the lifetime of the router identifying information or the network prefix in the database 102 is updated, the validity managing section 104 stores the time that is obtained by adding the lifetime to the time when the lifetime is updated. When the stored time has passed, the validity managing section 104 can determine that the router identifying information or the network prefix has become invalid.

Figure 4:
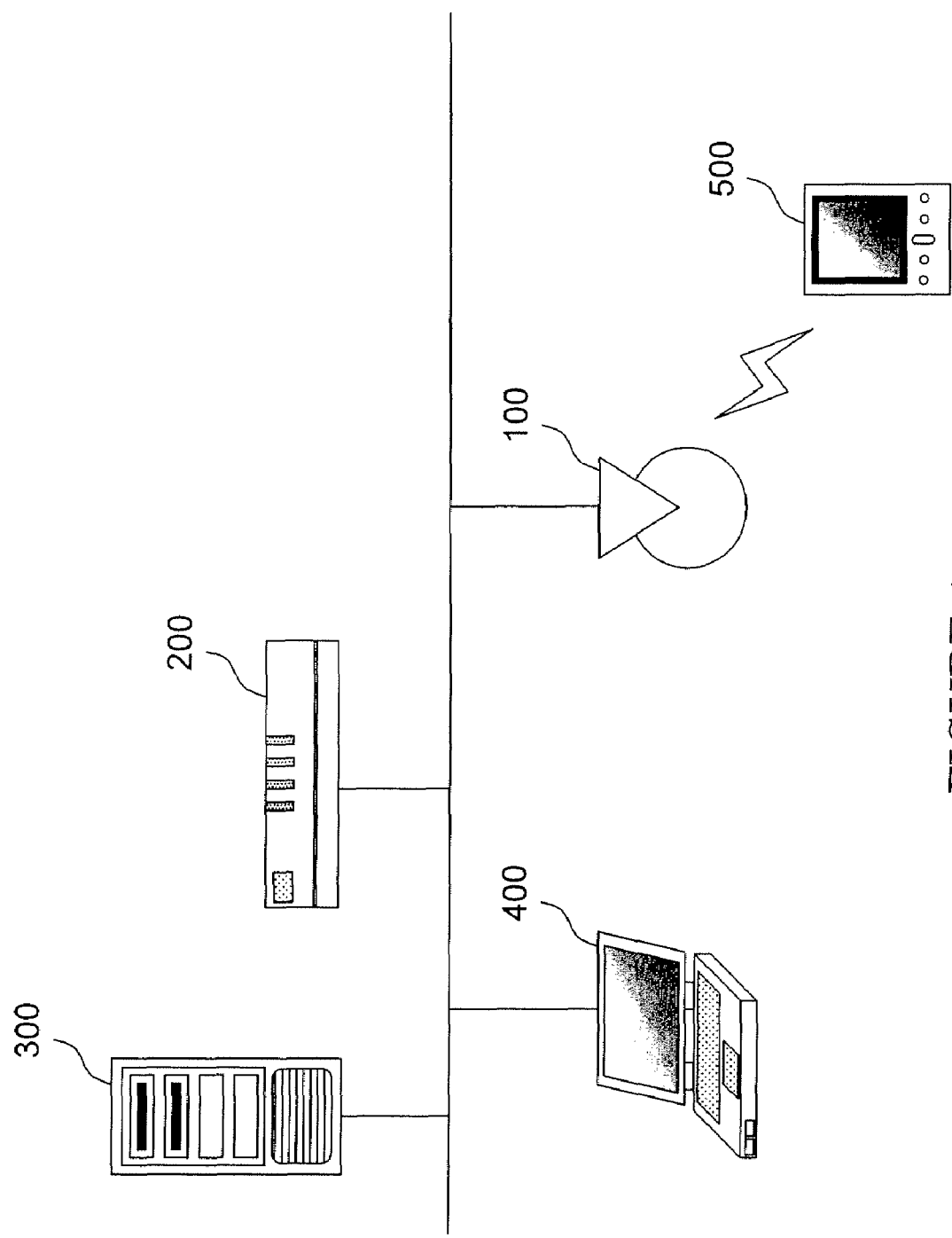
FIG. 4 is a system diagram showing an example of the configuration of a network including the bridging device according to the embodiment of the invention.

FIG. 4 is a system diagram showing an example of the configuration of a network including the bridging device 100 according to an embodiment of the invention. In the network shown in FIG. 4, the bridging device 100, a router 200, a server 300, and a PC 400 are connected via a LAN. A portable computer terminal 500 which is an IPv6 appliance is connected to the bridging device 100 via a wireless LAN.

Figure 5:
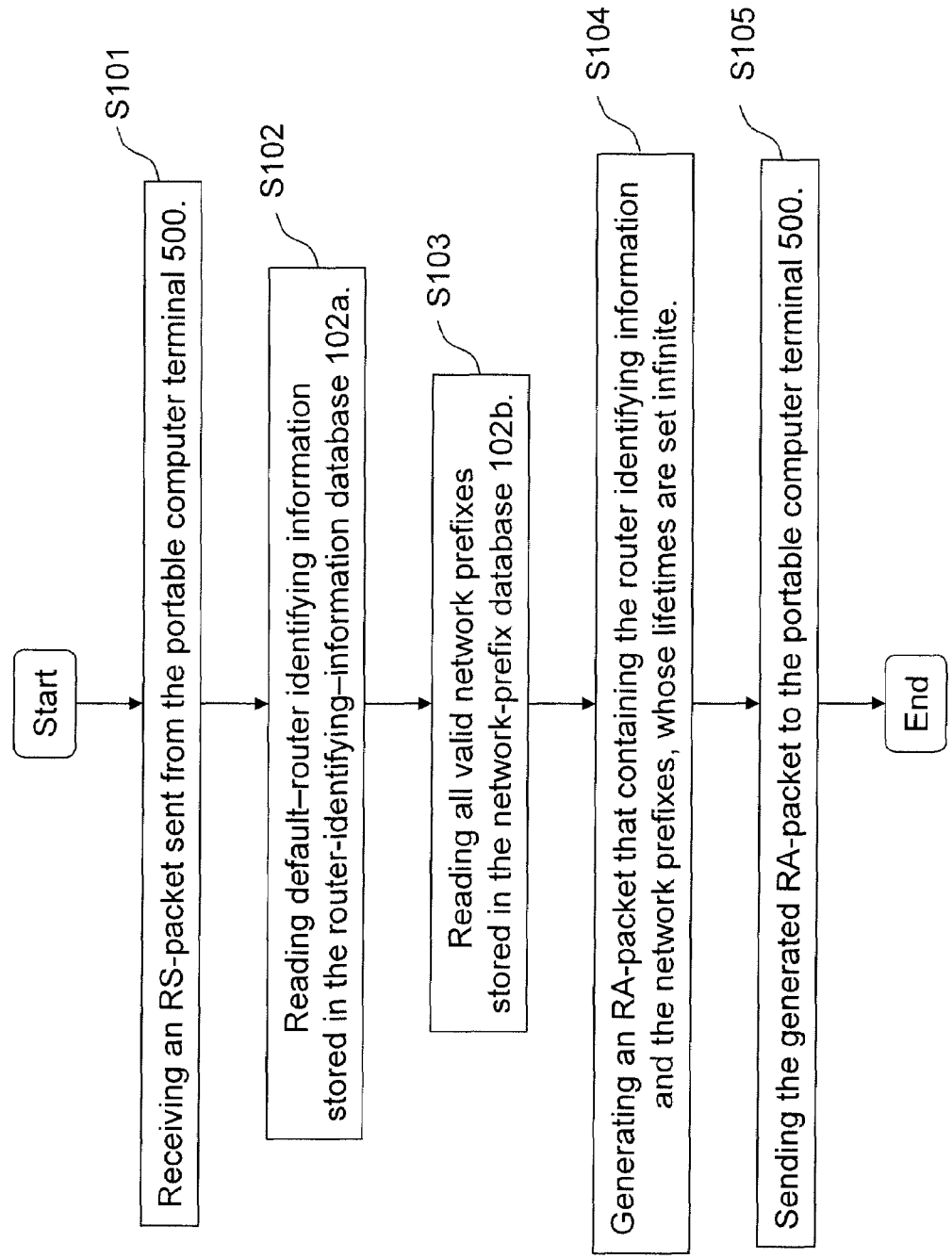
FIG. 5 is a flowchart of the operation of the bridging device according to the embodiment of the invention.

Referring first to FIGS. 1 and 5, the operation of the bridging device 100 according to the embodiment in the case where the portable computer terminal 500 is connected thereto will be described. FIG. 5 is a flowchart of the operation of the bridging device 100 in this case.

When the portable computer terminal 500 is connected to the bridging device 100, the portable computer terminal 500 sends an RS packet to the bridging device 100 via a wireless LAN. The communicating section 101 of the bridging device 100 receives the RS packet sent from the portable computer terminal 500 (step S101).

When the bridging device 100 receives the RS packet, then an RA-packet generating section 105 reads default-router identifying information (R1 in FIG. 4) from the router-identifying-information database 102*a* (step S102). The RA-packet generating section 105 further reads all valid network prefixes from the network-prefix database 102*b* (step S103).

Next, the RA-packet generating section 105 generates an RA packet containing the router identifying information and the network prefix read out, whose lifetimes are set infinite (step S104). When the range of the lifetime is limited, it is desirable to set the lifetime at the maximum.

The RA packet generated by the RA-packet generating section 105 is sent to the communicating section 101, from which it is sent to the portable computer terminal 500 (step S105).

Thus, upon reception of an RS packet, the bridging device 100 sends an RA packet containing router identifying information and a network prefix whose lifetimes are set infinite to the portable computer terminal 500. The portable computer terminal 500 can therefore continue communication with another communication terminal via the default router using the router identifying information and the network prefix transmitted even without receiving the RA packets that are regularly sent from the router.

Figure 6:
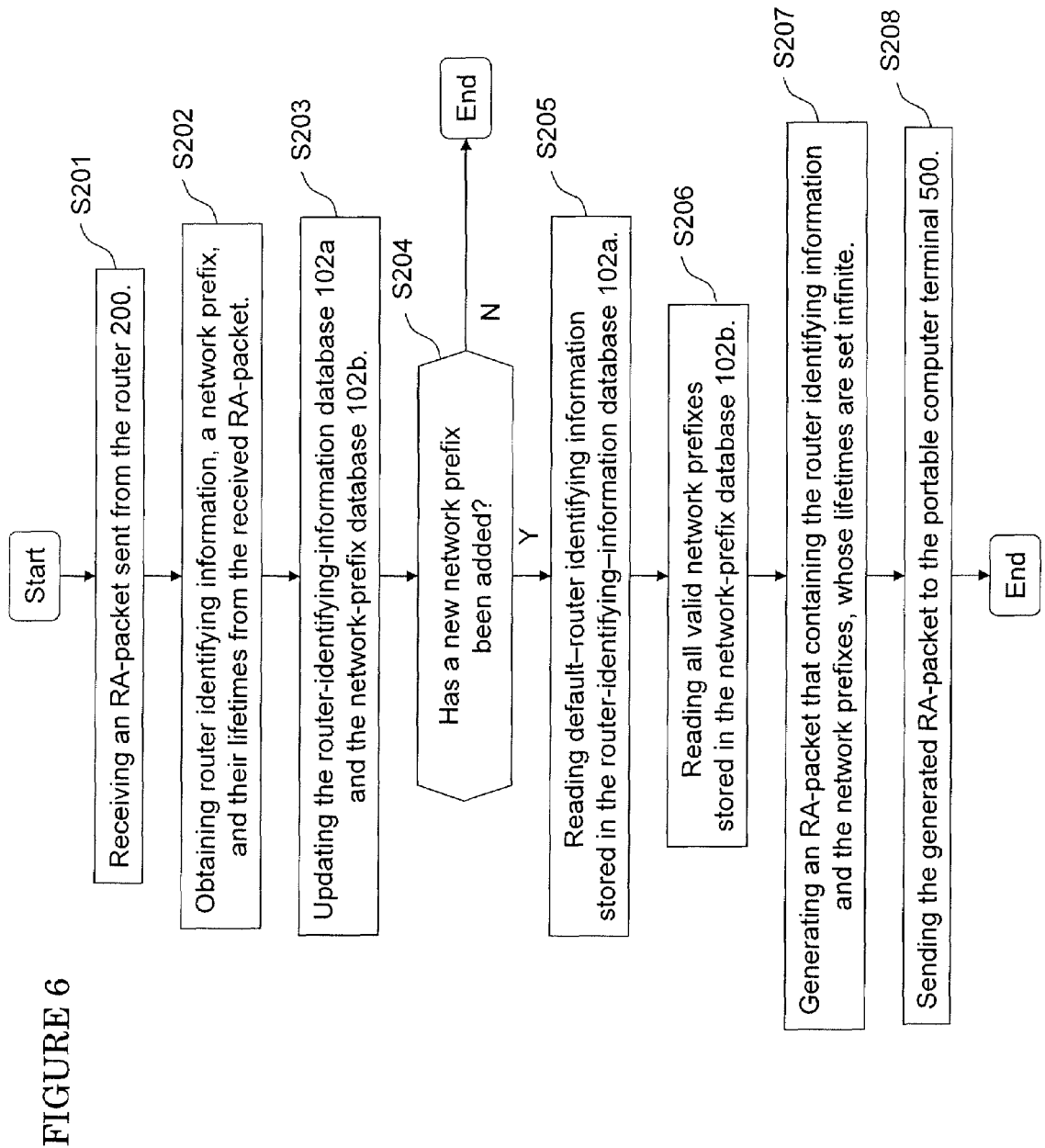
FIG. 6 is a flowchart of the operation of the bridging device according to the embodiment of the invention.

Referring then to FIGS. 1 and 6, the operation of the bridging device 100 in the case where the bridging device 100 receives an RA packet from the router 200 after the portable computer terminal 500 is connected to the bridging device 100 will be described. FIG. 6 is a flowchart of the operation of the bridging device 100 in this case.

The bridging device 100 receives an RA packet sent from a router 200 via the communicating section 101 (step S201).

The database updating section 103 obtains router identifying information, a network prefix, and their lifetimes from the received RA packet (step S202). The database updating section 103 then updates the router-identifying-information database 102*a* and the network-prefix database 102*b* (step S203).

Specifically, the database updating section 103 first finds the router identifying information and the network prefix in the received RA packet from the router-identifying-information database 102*a* and the network-prefix database 102*b*, respectively. The database updating section 103 then updates their lifetimes according to the lifetime contained in the received RA packet.

If one or both of the router identifying information and the network prefix contained in the received RA packet is not detected from the router-identifying-information database 102*a* or the network-prefix database 102*b*, the database updating section 103 adds and stores the router identifying information or the network prefix undetected to the router-identifying-information database 102*a* or the network-prefix database 102*b*, respectively, together with their lifetimes.

When a new network prefix is added to the network-prefix database 102*b* (Step S204), the RA-packet generating section 105 generates an RA packet for the portable computer terminal 500.

Even if new router identifying information is added to the router-identifying-information database 102*a*, the RA-packet generating section 105 may not necessarily notify the portable computer terminal 500 of the new router identifying information. This is because the portable computer terminal 500 can ensure communication with another communication terminal via the default router using default-router identifying information if having the default-router identifying information.

On the other hand, for the network prefix, there may be a case where communication with a communication terminal on a specific network can be conducted only with a specific network prefix. Accordingly, if a new network prefix is added to the network-prefix database 102*b*, it is desirable that the RA-packet generating section 105 send the network prefix to the portable computer terminal 500.

The operation of the RA-packet generating section 105 when a new network prefix is added to the network-prefix database 102*b* will now be described.

The RA-packet generating section 105 first reads out default-router identifying information stored in the router-identifying-information database 102*a* (step S205). The RA-packet generating section 105 then reads out all the valid network prefixes stored in the network-prefix database 102*b* (step S206).

The RA-packet generating section 105 then generates an RA packet containing the router identifying information and the network prefix read out, whose lifetimes are set infinite (step S207). The RA-packet generating section 105 sends the RA packet to the portable computer terminal 500 via the communicating section 101 (step S208).

Thus, when the RA packet received by the bridging device 100 contains a new network prefix that is not stored in the network-prefix database 102*b*, the network prefix is sent to the portable computer terminal 500. Thus, the portable computer terminal 500 can carry out communication using the new network prefix. The setting of the lifetime of the router identifying information and the network prefix infinite enables the portable computer terminal 500 to continue communication with another communication terminal via the default router using the router identifying information and the network prefix transmitted even without receiving RA packets that are regularly sent from the router, as in the above-described case.

In step S204, if no new network prefix is added to the network-prefix database 102*b* and only the lifetime of the router identifying information and the network prefix are updated by the database updating section 103, the bridging device 100 sends no RA packet to the portable computer terminal 500 (step S204). This is because the portable computer terminal 500 has already received the router identifying information and the network prefix whose lifetimes have been set infinite, so that there is no need to notify the portable computer terminal 500 of the update of the lifetime.

Thus, if the RA packet that the bridging device 100 has received only updates the lifetime of the router identifying information and the network prefix which are stored in the router-identifying-information database 102*a* and the network-prefix database 102*b*, respectively, there is no need to send the RA packet to the portable computer terminal 500. This eliminates the number of RA packets to be received by the portable computer terminal 500, thus reducing the processing load of the portable computer terminal 500.

Figure 7:
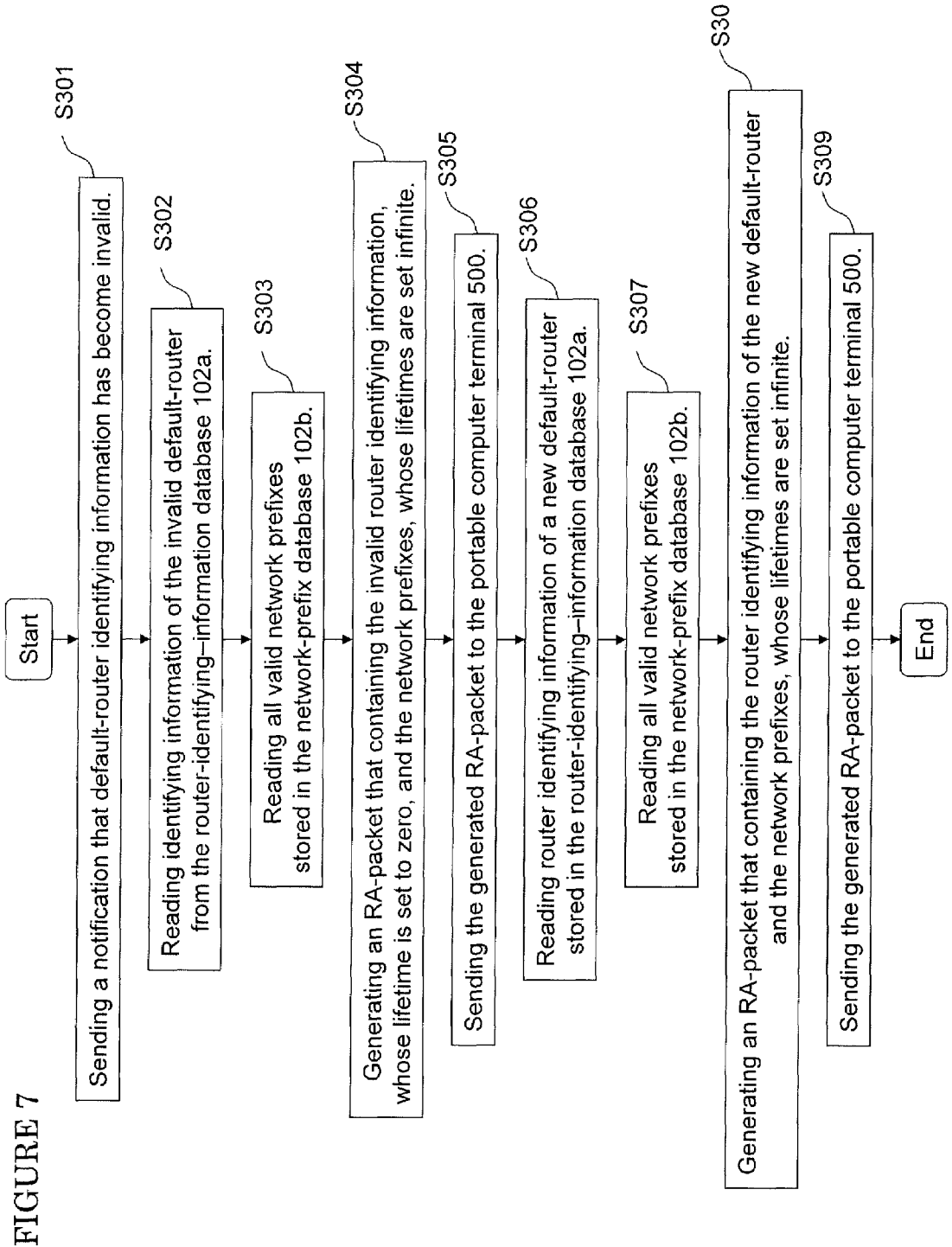
FIG. 7 is a flowchart of the operation of the bridging device according to the embodiment of the invention.
Figure 8:
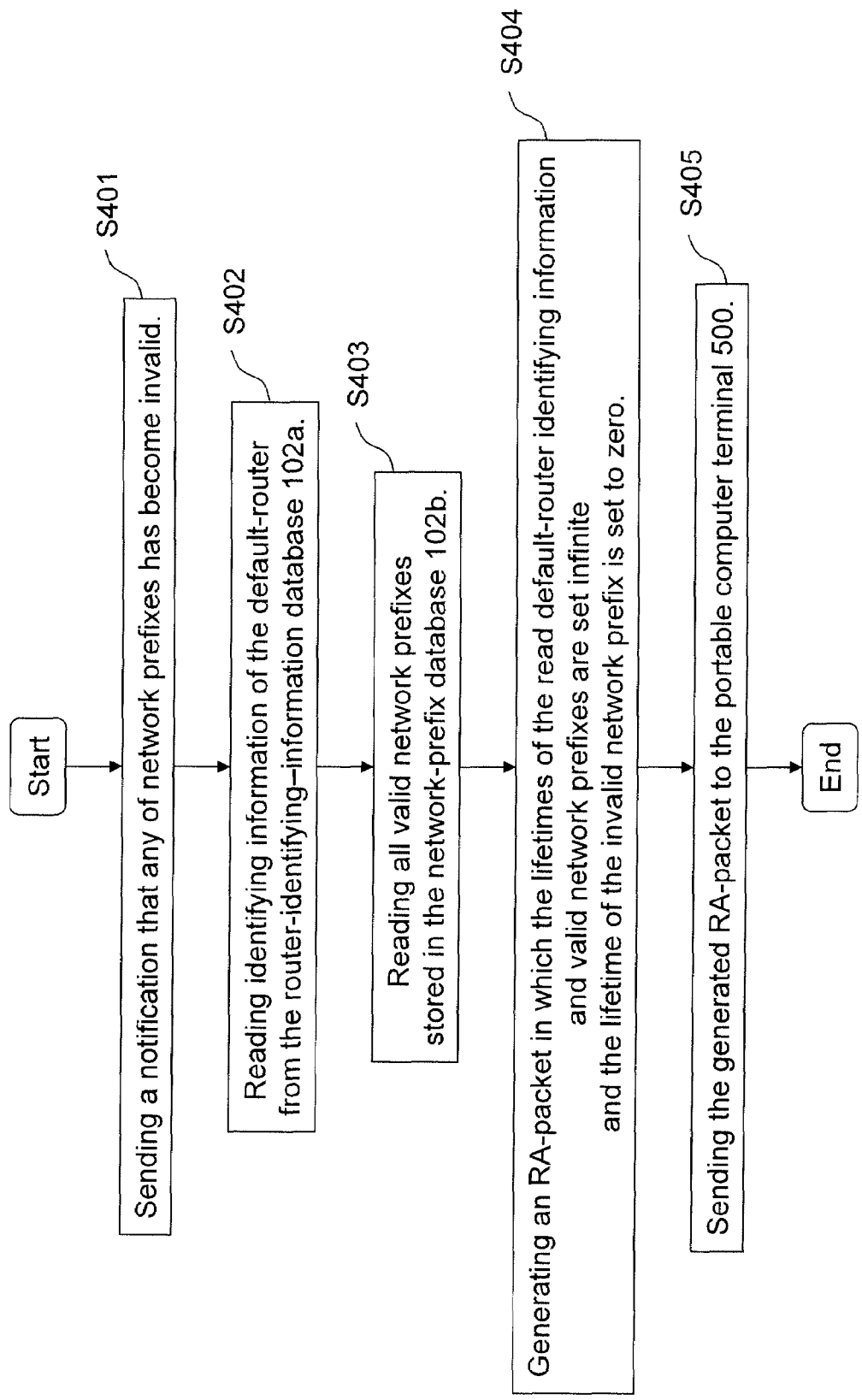
FIG. 8 is a flowchart of the operation of the bridging device according to the embodiment of the invention.

Referring next to FIGS. 1, 7, and 8, the operation of the bridging device 100 when the router identifying information contained in the router-identifying-information database 102*a* or the network prefix contained in the network-prefix database 102*b* of the bridging device 100 has become invalid will be described. FIGS. 7 and 8 are flowchart of the operation of the bridging device 100 in this case.

The validity of the router identifying information and the network prefix contained in the databases 102*a* and 102*b* is managed by the validity managing section 104, as described above. Accordingly, when the router identifying information or the network prefix has become invalid, the RA-packet generating section 105 generates an RA packet according to a notification from the validity managing section 104.

The case where the default-router identifying information in the router-identifying-information database 102*a* has become invalid will be described.

When the default-router identifying information in the router-identifying-information database 102*a* has become invalid, a notification thereof is sent from the validity managing section 104 to the RA-packet generating section 105 (step S301).

Upon reception of the notification, the RA-packet generating section 105 reads identifying information of the invalid default router from the router-identifying-information database 102*a* (step S302). The RA-packet generating section 105 further reads all the valid network prefixes stored in the network-prefix database 102*b* (step S303).

The RA-packet generating section 105 then generates an RA packet in which the lifetime of the read default-router identifying information is set to zero, and the lifetimes of the read network prefixes are set infinite (step S304). The RA-packet generating section 105 then sends the generated RA packet to the portable computer terminal 500 via the communicating section 101 (step S305).

Thus, the portable computer terminal 500 can be notified of the fact that the default router used in communication has become unavailable.

The RA-packet generating section 105 then reads identifying information of a new default router from the router-identifying-information database 102*a* (step S306). The new default router is selected from valid routers, whose identifying information is stored in the router-identifying-information database 102*a*.

The RA-packet generating section 105 reads out all the valid network prefixes stored in the network-prefix database 102*b* (step S307).

The RA-packet generating section 105 generates an RA packet in which the lifetime of the read router identifying information and network prefixes are set infinite (step S308), and sends it to the portable computer terminal 500 via the communicating section 101 (step S309).

Thus, the portable computer terminal 500 can ensure communication with another communication terminal via a new default router using the router identifying information and the network prefix transmitted. Since the lifetimes of the router identifying information and the network prefix contained in the RA packet transmitted are set infinite, the portable computer terminal 500 does not need to receive RA packets that are regularly sent from the routers, as in the above-described case.

In the foregoing embodiment, when the default-router identifying information has become invalid, all the network prefixes in the network-prefix database 102*b* are read out and sent to the portable computer terminal 500. Alternatively, only one valid network prefix may be sent.

Referring next to FIG. 8, the case where the lifetime of any of the network prefixes in the network-prefix database 102*b* has expired will be described.

When any of the network prefixes in the network-prefix database 102*b* has become invalid, a notification thereof is sent from the validity managing section 104 to the RA-packet generating section 105 (step S401).

Upon reception of the notification, the RA-packet generating section 105 reads default-router identifying information from the router-identifying-information database 102*a* (step S402). The RA-packet generating section 105 further reads out all the network prefixes stored in the network-prefix database 102*b* (step S403).

The RA-packet generating section 105 then generates an RA packet in which the lifetime of the read default-router identifying information and valid network prefixes are set infinite and the lifetime of the invalid network prefix is set to zero (step S404). The RA-packet generating section 105 then sends the generated RA packet to the portable computer terminal 500 via the communicating section 101 (step S405).

Thus, the portable computer terminal 500 can be notified of the network prefix that has become unavailable.

When both the default-router identifying information and the network prefix have become invalid at the same time, in step S304, the RA-packet generating section 105 may generate an RA packet in which the lifetimes of the default-router identifying information and the network prefix that have become invalid are set to zero, and may send the RA packet to the portable computer terminal 500 in step S305.

In that way, the bridging device 100 according to the embodiment receives an RA packet sent from the router 200, and stores the router identifying information and the network prefix contained in the received RA packet in the router-identifying-information database 102*a* and the network-prefix database 102*b* of the bridging device 100, respectively. When the router identifying information or the network prefix has become invalid, the bridging device 100 of the embodiment generates and sends an RA packet containing valid router identifying information and network prefix information, whose lifetimes are set infinite. This arrangement allows the number of RA packets that the portable computer terminal 500 must process to be decreased, thus reducing the process load of the portable computer terminal 500.

Figure 9:
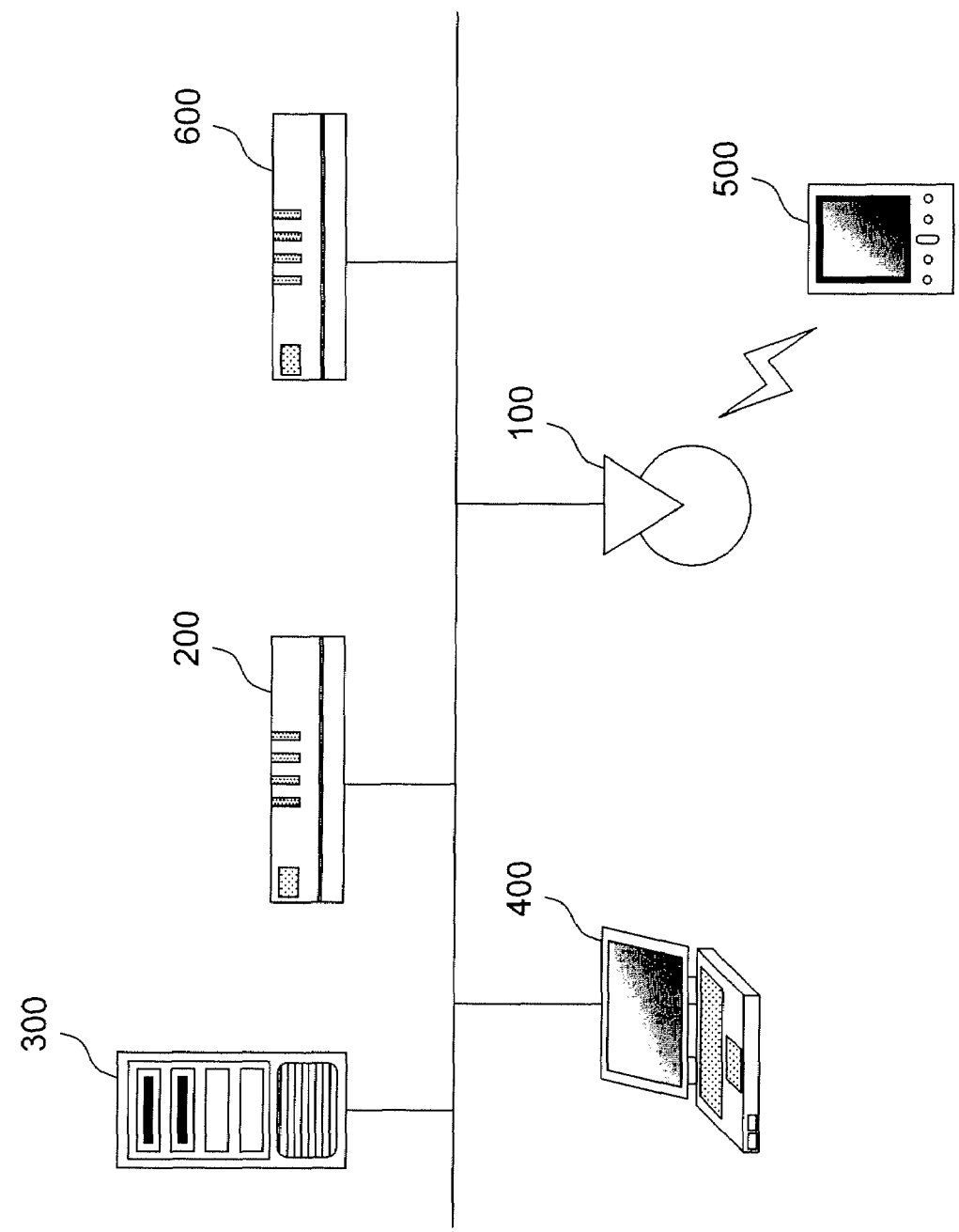
FIG. 9 is a system diagram showing an example of the configuration of a network including the bridging device according to the embodiment of the invention.

As shown in FIG. 4, the embodiment has been described for the case in which there is one router 200 on the network, from which the bridging device 100 receives an RA packet. Furthermore, the number of RA packets sent to the portable computer terminal 500 can be reduced in the case where there is a plurality of routers (the router 200 and a router 600) on the network, each of which regularly sends RA packets, as shown in FIG. 9.

Specifically, the bridging device 100 first stores the router identifying information and the network prefix contained in the RA packets sent from the routers 200 and 600 in the router-identifying-information database 102*a* and the network-prefix database 102*b*, respectively. Upon reception of a new RA packet, the database updating section 103 of the bridging device 100 updates the databases 102*a* and 102*b* using the router identifying information, the network prefix, and their lifetimes contained in the RA packet.

For example, when the network prefix in the network-prefix database 102*b* has become invalid, the RA-packet generating section 105 reads default-router identifying information and a valid network prefix from the database 102. The RA-packet generating section 105 generates an RA packet in which the lifetimes are set infinite, and the lifetime of the invalid network prefix to zero, and sends the RA packet to the portable computer terminal 500 via the communicating section 101.

Thus, the portable computer terminal 500 can continue communication with another communication terminal using a default router and a valid network prefix without receiving RA packets that are regularly sent from the routers 200 and 600.

The bridging device 100 can be implemented for example, by using a general-purpose computer as basic hardware. In other words, the database updating section 103, the validity managing section 104, and the RA-packet generating section 105 can be achieved by execution of a computer program stored in a computer readable medium by a processor incorporated in the computer. In this case, the bridging device 100 may be implemented using a computer readable medium incorporated in the computer and in which the computer program is stored in advance, or distributed via a network and installed in the computer, or a portable computer readable medium such as a CD-ROM, for example. The router-identifying-information database 102a and the network-prefix database 102b can be a memory internal or external to the computer, a hard disk, or storage media such as a CD-R, CD-RW, DVD-RAM, and DVD-R or the like.

The invention is not limited to the embodiments above as unchanged, which can be implemented by modifying components within the scope of the appended claims. In addition, a plurality of the components disclosed in the embodiments may be properly combined to form various inventions. For example, some of the components may be omitted from all the components shown in the embodiments. Furthermore, the components shown in different embodiments may be properly combined.

Accordingly, numerous modifications and variations of the present invention are possible in light of the above teachings. It is therefore to be understood that within the scope of the appended claims, the invention may be practiced otherwise than as specifically described herein.

What is claimed is:

1. A bridging device comprising:
    a storage unit configured to store router identifying information and network prefix information in association with respective lifetimes;
    a first receiving unit configured to receive a first router advertisement packet containing router identifying information and network prefix information, and the respective lifetimes;
    an updating unit configured to update the router identifying information, the network prefix information, and the respective lifetimes which are stored in the storage unit by using the router identifying information, the network prefix information, and the respective lifetimes contained in the first router advertisement packet received by the first receiving unit;
    a determination unit configured to determine whether the router identifying information and the network prefix information stored in the storage unit is valid with respect to the lifetimes stored in the storage unit;
    a generation unit configured to generate a second router advertisement packet when the determination unit determines that, among the router identifying information stored in the storage unit, identifying information of a router having the highest priority for communication is invalid or when the determination unit determines that any of the network prefix information stored in the storage unit is invalid, the second router advertisement packet containing identifying information of the router having the highest priority of a valid-router identifying information stored in the storage unit and valid-network-prefix information stored in the storage unit, whose lifetimes are set infinite; and
    a transmission unit configured to transmit the second router advertisement packet to a communication terminal.

2. The bridging device according to claim 1, wherein:
    when the determination unit determines that identifying information of a router having the highest priority for communication is invalid, the generation unit is further configured to generate a third router advertisement packet in which the lifetime of the router identifying information is set to zero, and
    the transmission unit is further configured to transmit the third router advertisement packet to the communication terminal.

3. The bridging device according to claim 1, wherein:
    when the determination unit determines that any of the network prefix information stored in the storage unit is invalid, the generation unit is further configured to generate the second router advertisement packet in which the lifetime of the network prefix information is set to zero.

4. The bridging device according to claim 1, wherein:
    when the first router advertisement packet contains new network prefix information that is not stored in the storage unit, the updating unit is configured to add the new network prefix information and its lifetime to the storage unit,
    when the new network prefix information is added to the storage unit by the updating unit, the generation unit is configured to generate the second router advertisement packet, and
    the transmission unit is configured to transmit the second router advertisement packet to the communication terminal.

5. The bridging device according to claim 1, further comprising:
    a second receiving unit configured to receive a router solicitation packet transmitted from a communication terminal, wherein
    the generation unit generates the second router advertisement packet upon reception of the router solicitation packet, and
    the transmission unit transmits the second router advertisement packet to the communication terminal that has sent the router solicitation packet.

6. The bridging device according to claim 1 wherein the generation unit is configured to set the lifetimes of the router identifying information and the network prefix information contained in the second router advertisement packet to a maximum lifetime in case that range of the lifetime is limited.

7. A method for controlling a bridging device having a storage unit configured to store router identifying information and network prefix information in association with respective lifetimes and a determination unit configured to determine whether the router identifying information and the network prefix information stored in the storage unit is valid using the lifetimes stored in the storage unit, the method comprising:
    receiving a first router advertisement packet containing router identifying information and network prefix information, and the respective lifetimes;
    updating the router identifying information, the network prefix information, and the respective lifetimes which are stored in the storage unit by using the router identifying information, the network prefix information, and the respective lifetimes contained in the received first router advertisement packet;

determining whether the router identifying information and the network prefix information stored in the storage unit is valid with respect to the lifetimes stored in the storage unit;

generating a second router advertisement packet when the determining step determines that, of the router identifying information stored in the storage unit, identifying information of a router having the highest priority for communication is invalid or when the determining step determines that any of the network prefix information stored in the storage unit is invalid, the second router advertisement packet containing identifying information of the router having the highest priority of a valid-router identifying information stored in the storage unit and valid-network-prefix information stored in the storage unit, whose lifetimes are set infinite; and transmitting the generated second router advertisement packet to a communication terminal.

8. The method for controlling a bridging device according to claim 7, the method further comprising:

generating a third router advertisement packet in which the lifetime of the router identifying information is set to zero when the determination unit determines that identifying information of a router having the highest priority for communication is invalid, and transmitting the third router advertisement packet to the communication terminal.

9. A computer readable medium storing a computer program which when executed by a bridging device having a storage unit configured to store router identifying information and network prefix information in association with respective lifetimes and a determination unit configured to determine whether the router identifying information and the network prefix information stored in the storage unit is valid using the lifetimes stored in the storage unit, results in performance of steps comprising:

storing router identifying information and network prefix information in association with the respective lifetimes;

receiving a first router advertisement packet containing router identifying information and network prefix information, and the respective lifetimes;

updating the router identifying information, the network prefix information, and the respective lifetimes using the router identifying information, the network prefix information, and the lifetime of the information contained in the first router advertisement packet received;

determining whether the stored router identifying information and the network prefix information is valid using the stored lifetime;

generating a second router advertisement packet when it is determined that, among the stored router identifying information, identifying information of a router having the highest priority for communication is invalid or when it is determined that any of the stored network prefix information is invalid, the second router advertisement packet containing identifying information of a router having the highest priority among the stored valid-router identifying information and stored valid-network-prefix information, whose lifetimes are set infinite; and transmitting the generated second router advertisement packet to a communication terminal.

10. The computer readable medium according to claim 9, wherein execution of said stored computer program results in performance of further steps comprising:

generating a third router advertisement packet in which the lifetime of identifying information of a router having the highest priority for communication among the stored router identifying information is set to zero when it is determined that the router identifying information is invalid; and transmitting the third router advertisement packet to the communication terminal.

* * * * *